(12) United States Patent
Peng et al.

(10) Patent No.: US 12,684,056 B2
(45) Date of Patent: Jul. 14, 2026

(54) TOUCH-SENSITIVE KEY PROTECTIVE FILM, MOBILE PHONE SHELL, AND PROTECTIVE FILM STICKING DEVICE

(71) Applicant: Dongguan Yuanpu Technology Co., Ltd, Dongguan (CN)

(72) Inventors: Yaxing Peng, Dongguan (CN); Wei Jiang, Dongguan (CN); Ying Chen, Dongguan (CN)

(73) Assignee: Dongguan Yuanpu Technology Co., Ltd, Dongguan City (CN)

( * ) Notice: Subject to any disclaimer, the term of this patent is extended or adjusted under 35 U.S.C. 154(b) by 228 days.

(21) Appl. No.: 18/772,111

(22) Filed: Jul. 13, 2024

(65) Prior Publication Data

US 2024/0380831 A1     Nov. 14, 2024

(30) Foreign Application Priority Data

Jun. 17, 2024     (CN) .......................... 202421372646.8

(51) Int. Cl.
 *H04M 1/02*          (2006.01)
 *H04M 1/72466*     (2021.01)
(52) U.S. Cl.
 CPC ....... *H04M 1/026* (2013.01); *H04M 1/72466* (2021.01)
(58) Field of Classification Search
 None
 See application file for complete search history.

(56) References Cited

U.S. PATENT DOCUMENTS

| | | | | |
|---|---|---|---|---|
| 9,317,156 | B2 * | 4/2016 | Sharma ................. | G06F 3/0488 |
| 10,348,354 | B1 * | 7/2019 | Balourdet ............. | G06F 1/1688 |
| 11,419,231 | B1 * | 8/2022 | Lancaster-Larocque ................... C03B 11/08 | |
| 2010/0315356 | A1 * | 12/2010 | Ferren ................. | H04M 1/0281 345/173 |
| 2012/0261930 | A1 * | 10/2012 | Bethea ...................... | A45F 5/00 294/25 |
| 2014/0226062 | A1 * | 8/2014 | Parrill .................... | G03B 17/56 348/376 |
| 2015/0002993 | A1 * | 1/2015 | Lee .......................... | G06F 21/32 361/679.02 |

(Continued)

FOREIGN PATENT DOCUMENTS

| | | | | |
|---|---|---|---|---|
| CN | 204249481 U | 4/2015 | | |
| CN | 120639892 A | * 9/2025 | ............ | H04M 1/236 |

(Continued)

*Primary Examiner* — Matthew A Fry

(57) ABSTRACT

The present disclosure relates to a touch-sensitive key protective film, a mobile phone shell, and a protective film sticking device. The touch-sensitive key protective film is stuck to an end face of a touch-sensitive key disposed on a side edge of the mobile phone. The touch-sensitive key protective film is an obround membrane, including a conductive adhesive layer, an explosion-proof film layer, a glass layer, and an oil-resistant layer that are sequentially arranged, where the conductive adhesive layer is bonded to the end face of the touch-sensitive key disposed on the side edge of the mobile phone, a thickness of the explosion-proof film layer is 0.08-0.12 mm, and the thickness of the glass layer is 0.18-0.22 mm. The touch-sensitive key protective film is bonded to the touch-sensitive key disposed on the side edge of the mobile phone through the conductive adhesive.

10 Claims, 6 Drawing Sheets

(56)  References Cited

U.S. PATENT DOCUMENTS

2016/0135314  A1 *   5/2016   Ma ........................ H04B 1/3888
                                                      428/177
2017/0094039  A1 *   3/2017   Lu ............................ B32B 17/00
2022/0075464  A1 *   3/2022   Lee ....................... H05K 5/0217
2025/0349477  A1 *  11/2025   Datta .................... G06F 1/1626

FOREIGN PATENT DOCUMENTS

DE        202024104260  U1 *  10/2024    ........... A45C 11/002
KR         20090117466  A  *  11/2009    .......... H04M 1/0283

* cited by examiner a b

TOUCH-SENSITIVE KEY PROTECTIVE FILM, MOBILE PHONE SHELL, AND PROTECTIVE FILM STICKING DEVICE

CROSS-REFERENCE TO RELATED APPLICATIONS

This application claims the benefit of priority from Chinese Patent Application No. 202421372646.8, filed on Jun. 17, 2024. The content of the aforementioned application, including any intervening amendments made thereto, is incorporated herein by reference in its entirety.

TECHNICAL FIELD

The present disclosure relates to the technical field of mobile phone accessories, and particularly relates to a touch-sensitive key protective film, a mobile phone shell with the touch-sensitive key protective film, and a protective film sticking device for the touch-sensitive key protective film.

BACKGROUND

Continuous development of mobile phone technology makes mobile phones increasingly mature, having brought lots of conveniences to people's lives. Many functions of mobile phones are implemented through touch screens, and for example, many operations of software in the prior art are implemented through touch screens in an integrated manner. However, it is inconvenient to implement some operations through touch screens, so some physical buttons are still used, such as volume buttons and screen lock buttons. Some mobile phones are provided with touch-sensitive keys on side edges thereof, to implement more shortcut operations, such as fingerprint unlocking, slidable image zooming in/out, image switching, slidable camera zooming in/out, slidable volume adjustment, point touch to take photos, phone call answering, and the like.

The touch-sensitive key disposed on the side edge of the mobile phone is generally sunk or flush with a surface of a middle frame of the mobile phone, so that it is difficult for the user to align his/her fingers with the touch-sensitive key disposed on the side edge of the mobile phone during use thereof, thereby resulting in a poor user experience. Further, the mobile phone shell generally wraps the middle frame. In order not to affect the operability of the touch-sensitive key disposed on the side edge of the mobile phone, the mobile phone shell is usually provided with a hole at the location of the touch-sensitive key disposed on the side edge of the mobile phone, to expose the touch-sensitive key disposed on the side edge of the mobile phone, so that the user's fingers can touch the touch-sensitive key disposed on the side edge of the mobile phone. Because the touch-sensitive key disposed on the side edge of the mobile phone is always exposed and not protected by the mobile phone shell, scratches and damages are likely to occur, thereby affecting the safe use of the touch-sensitive key disposed on the side edge of the mobile phone.

SUMMARY

In order to overcome the defects in the prior art, the present disclosure provides a touch-sensitive key protective film, a mobile phone shell with the touch-sensitive key protective film, and a protective film sticking device for the touch-sensitive key protective film.

In a first aspect, the present disclosure provides a touch-sensitive key protective film that is stuck to an end face of a touch-sensitive key disposed on a side edge of the mobile phone. The touch-sensitive key protective film is an obround membrane, and an area of the touch-sensitive key protective film is not larger than that of the end face of the touch-sensitive key disposed on the side edge of the mobile phone. The touch-sensitive key protective film includes a conductive adhesive layer, an explosion-proof film layer, a glass layer, and an oil-resistant layer that are sequentially arranged, where the conductive adhesive layer is bonded to the end face of the touch-sensitive key disposed on the side edge of the mobile phone, a thickness of the explosion-proof film layer is 0.08-0.12 mm, and the thickness of the glass layer is 0.18-0.22 mm.

In some embodiments, the oil-resistant layer is an anti-fingerprint (AF) coating sprayed and cured on a surface of the glass layer.

In some embodiments, a round chamfer is arranged at an edge of an outer end face of the touch-sensitive key protective film, while a chamfer is not arranged at an edge of an inner end face of the touch-sensitive key protective film. A connecting end is arranged at an end of the touch-sensitive key protective film, an arc-shaped groove is inwardly formed on both outer side walls in a width direction of the connecting end respectively, and the arc-shaped groove is arranged to be away from a center of the touch-sensitive key protective film.

In some embodiments, a thickness of the explosion-proof film layer is 0.1 mm, and the thickness of the glass layer is 0.2 mm.

In a second aspect, the present disclosure further provides a mobile phone shell with the touch-sensitive key protective film, including a shell body and the touch-sensitive key protective film described in the first aspect. An obround hole is formed at a position of a side wall of the shell body corresponding to the touch-sensitive key disposed on the side edge of the mobile phone. The touch-sensitive key protective film is located inside the obround hole and pasted on the end face of the touch-sensitive key disposed on the side edge of the mobile phone, and a gap for movement of the touch-sensitive key protective film is formed between an outer side wall of the touch-sensitive key protective film and an inner side wall of the obround hole.

In some embodiments, the obround hole is provided with a connecting portion and a clearance portion, the connecting portion is in interference fit with a connecting end of the touch-sensitive key protective film, and the clearance portion fits with the gap of a movable end of the touch-sensitive key protective film.

In a third aspect, the present disclosure further provides a protective film sticking device for the touch-sensitive key protective film, including a jig and the touch-sensitive key protective film described in the first aspect. The jig matches the mobile phone in shape, and the jig is buckled to the mobile phone from a back of the mobile phone. A protective film sticking hole is formed in a side wall of the jig at the location of the touch-sensitive key disposed on the side edge of the mobile phone. The protective film sticking hole matches the touch-sensitive key protective film in shape, and the touch-sensitive key protective film is positioned with the touch-sensitive key disposed on the side edge of the mobile phone through the protective film sticking hole, stuck and fixed to the end face of the touch-sensitive key disposed on the side edge of the mobile phone through the conductive adhesive layer of the touch-sensitive key protective film.

In some embodiments, a positioning sheet and a release film are further included, where the touch-sensitive key protective film is arranged between the positioning sheet and the release film. Before protective film sticking, the release film is separated from the conductive adhesive layer of the touch-sensitive key protective film, and the touch-sensitive key protective film is connected to the jig through the positioning sheet. The positioning sheet is provided with a connecting area and a first protective film sticking area, where the connecting area is fixedly connected to the jig. The touch-sensitive key protective film is located in the first protective film sticking area, and the first protective film sticking area is coated on an outer side surface of the side wall of the jig in the protective film sticking process, so that the touch-sensitive key protective film 1 is embedded in the protective film sticking hole.

In some embodiments, the positioning sheet is further provided with a second protective film sticking area. In the protective film sticking process, the second protective film sticking area covers a front side of the jig. The positioning sheet is provided with positioning holes in both the second protective film sticking area and the first protective film sticking area, and the jig is correspondingly provided with positioning blocks. In the protective film sticking process, the positioning sheet is in positioning connection with the jig through the positioning holes and the positioning blocks that match each other.

In some embodiments, the screen protector is arranged in the second protective film sticking area of the positioning sheet. In the protective film sticking process, the screen protector is stuck to a screen of the mobile phone.

Compared with the prior art, the present disclosure has the beneficial effects as follows: The touch-sensitive key protective film is bonded to the touch-sensitive key disposed on the side edge of the mobile phone through the conductive adhesive, so that the touch-sensitive key protective film is stably connected to the touch-sensitive key disposed on the side edge of the mobile phone, without prejudice to normal use of the touch-sensitive key disposed on the side edge of the mobile phone. The glass layer and the explosion-proof film layer of the touch-sensitive key protective film are used to protect the touch-sensitive key disposed on the side edge of the mobile phone and prevent the touch-sensitive key disposed on the side edge of the mobile phone from being scratched.

Figure 1:
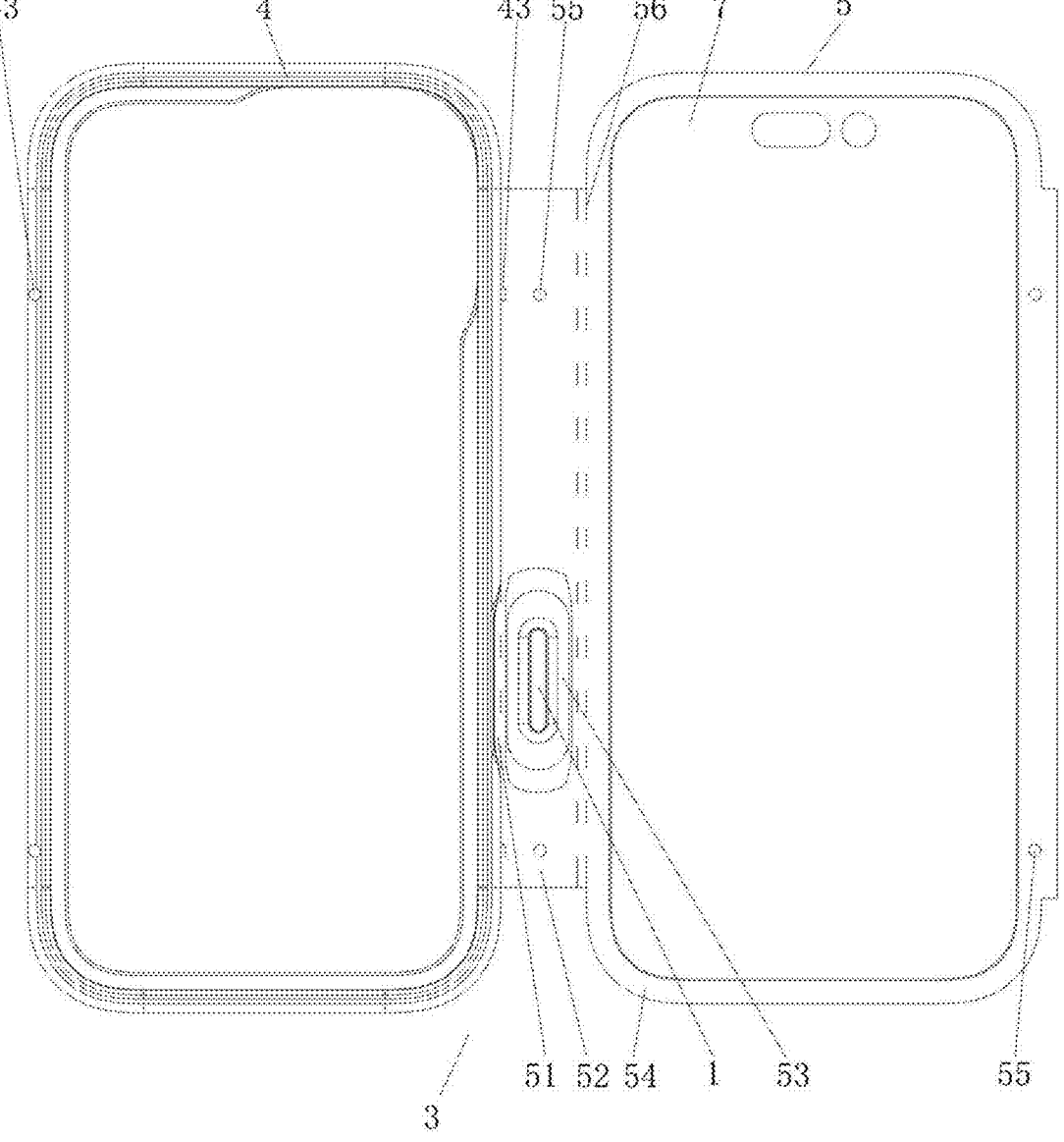
FIG. 1 is a schematic diagram of a planar structure of a protective film sticking device in an embodiment of the present disclosure.

REFERENCE NUMERALS 101, mobile phone; 102, touch-sensitive key disposed on the side edge of the mobile phone;
1, touch-sensitive key protective film; 11, conductive adhesive layer; 12, explosion-proof film layer; 13, glass layer; 14, oil-resistant layer; 15, round chamfer; 16, connecting end; 17, arc-shaped groove; 18, movable end;
2, mobile phone shell; 21, shell body; 22, obround hole; 23, gap; 24, connecting portion; 25, clearance portion;
3, protective film sticking device;
4, jig; 41, protective film sticking hole; 42, positioning groove; 43, positioning block;
5, positioning sheet; 51, connecting area; 52, first protective film sticking area; 53, protruding block; 54, second protective film sticking area; 55, positioning hole; 56, crease;
6, release film; and
7, screen protector.

DETAILED DESCRIPTIONS OF THE EMBODIMENTS

Specific implementations of the present disclosure will be introduced with reference to the accompanying drawings.

FIG. 1 illustrates a protective film sticking device 3 for a touch-sensitive key protective film 1, where a jig 4 is illustrated in a left part of FIG. 1, the touch-sensitive key protective film 1 is illustrated in a middle part thereof, and a screen protector 7 is illustrated in a right part thereof. The touch-sensitive key protective film 1 and the screen protector 7 are connected to the jig 4 through a positioning sheet 5. In a protective film sticking process, the jig 4 is configured for positioning with a mobile phone 101, so that the touch-sensitive key protective film 1 and the screen protector 7 can be accurately stuck to the mobile phone 101 because the touch-sensitive key protective film 1 and the screen protector 7 can be well positioned with the mobile phone 101.

Figure 2:
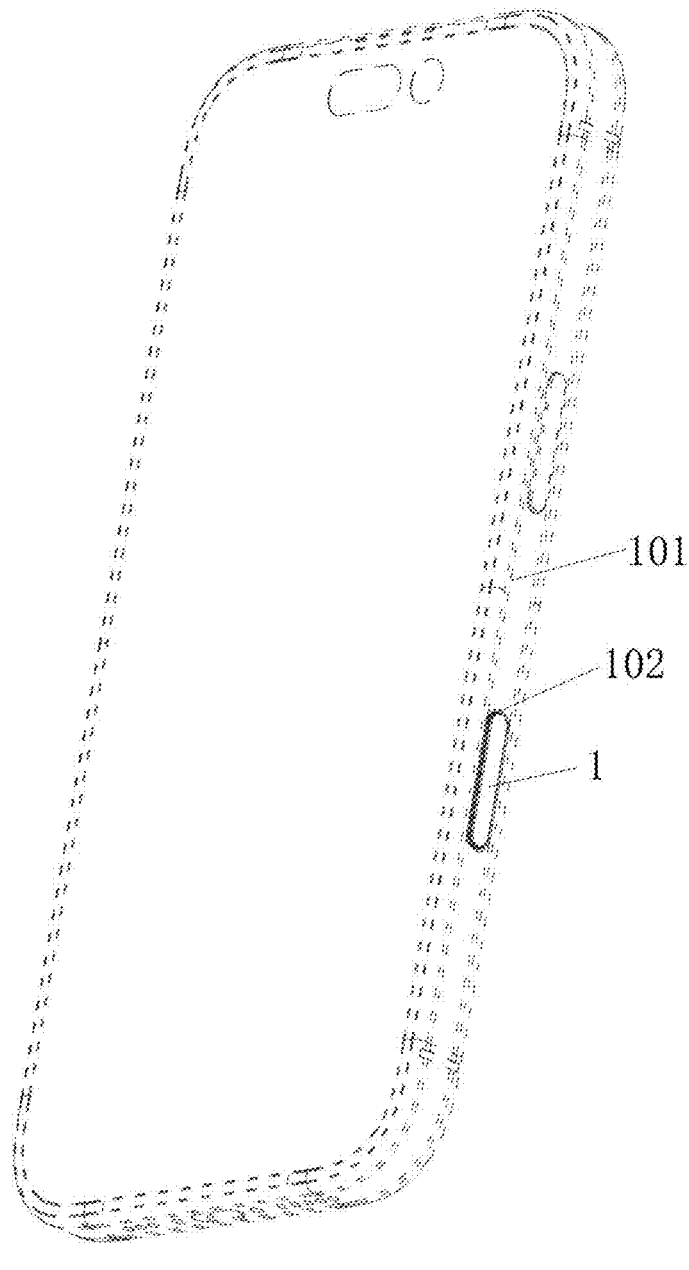
FIG. 2 is a schematic diagram of a three-dimensional structure of a touch-sensitive key protective film stuck to a mobile phone in an embodiment of the present disclosure.
Figure 3:
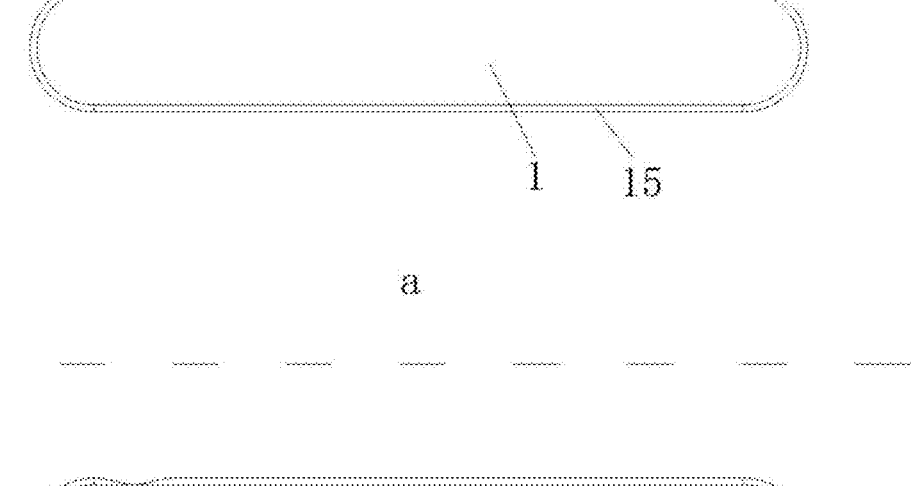
FIG. 3 is a schematic diagram of two planar structures of a touch-sensitive key protective film in an embodiment of the present disclosure.
Figure 3:
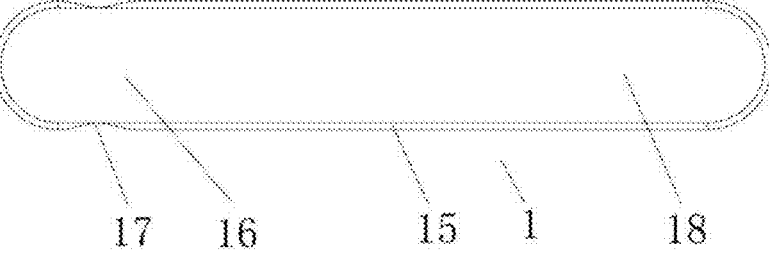
Figure 4:
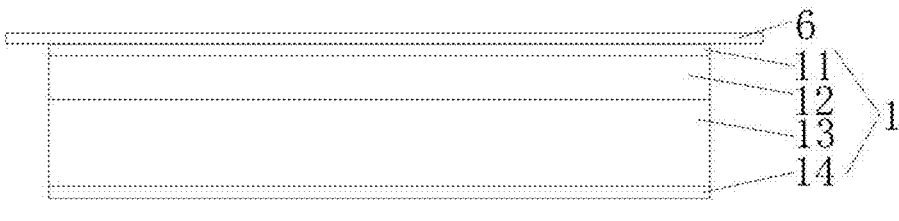
FIG. 4 is a schematic diagram of a hierarchical structure of a touch-sensitive key protective film in an embodiment of the present disclosure.
Figure 5:
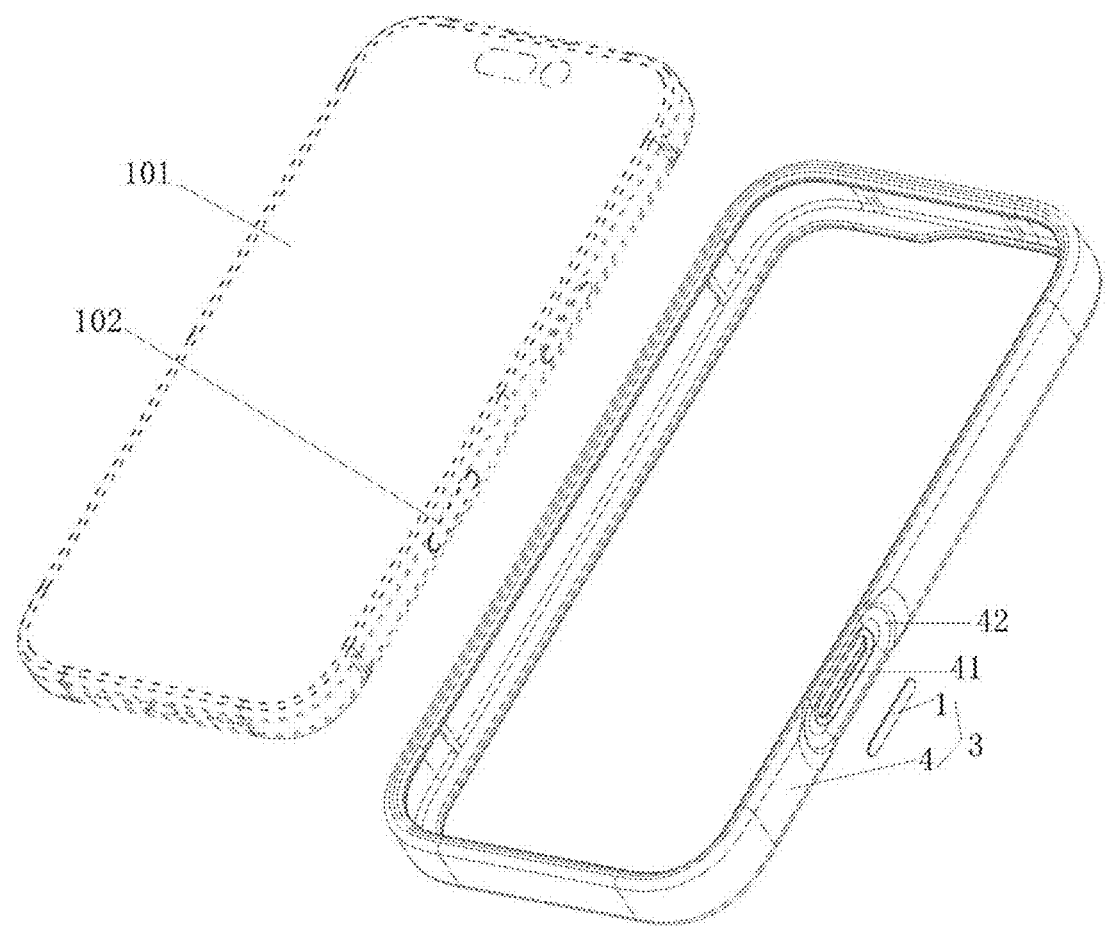
FIG. 5 is a schematic diagram of a three-dimensional structure of a mobile phone with a jig and a touch-sensitive key protective film in an embodiment of the present disclosure.

With reference to FIGS. 2-4, the touch-sensitive key protective film 1 is stuck to an end face of a touch-sensitive key 102 disposed on a side edge of the mobile phone. The touch-sensitive key protective film 1 is an obround membrane, and an area of the touch-sensitive key protective film 1 is not larger than that of the end face of the touch-sensitive key 102 disposed on the side edge of the mobile phone. The touch-sensitive key protective film 1 includes a conductive adhesive layer 11, an explosion-proof film layer 12, a glass layer 13, and an oil-resistant layer 14 that are sequentially arranged, where the conductive adhesive layer 11 is bonded to the end face of the touch-sensitive key 102 disposed on the side edge of the mobile phone, a thickness of the explosion-proof film layer 12 is 0.08-0.12 mm, and the thickness of the glass layer 13 is 0.18-0.22 mm.

The touch-sensitive key 102 disposed on the side edge of the mobile phone, in addition to a function of fingerprint unlocking, also has functions such as slidable volume adjustment, slidable camera zooming in/out, point touch to take photos, phone call answering, and the like.

The obround touch-sensitive key protective film 1 in this embodiment is bonded to the touch-sensitive key 102 disposed on the side edge of the mobile phone through the conductive adhesive, so that the touch-sensitive key protective film 1 is stably connected to the touch-sensitive key 102 disposed on the side edge of the mobile phone, without prejudice to normal use of the touch-sensitive key 102 disposed on the side edge of the mobile phone. The glass layer 13 and the explosion-proof film layer 12 of the touch-sensitive key protective film 1 are used to protect the touch-sensitive key 102 disposed on the side edge of the mobile phone and prevent the touch-sensitive key 102 disposed on the side edge of the mobile phone from being scratched.

With reference to FIG. 4, the oil-resistant layer 14 in this embodiment is an anti-fingerprint (AF) coating sprayed and cured on a surface of the glass layer 13, to prevent a large amount of oil stains from adhesion to a surface of the touch-sensitive key protective film 1 during use.

It can be understood that such arrangement, through the AF coating, enables to repel water and oil and form the oil-resistant layer 14 that prevents oil stains from adhesion on the surface of the glass layer 13, thus improving hydrophobic, oil-repellent and anti-fouling properties of the touch-sensitive key protective film 1.

With reference to FIG. 3, a round chamfer 15 is arranged at an edge of an outer end face of the touch-sensitive key protective film 1 in this embodiment, to prevent the touch-sensitive key protective film 1 from scratching a user's skin, while a chamfer is not arranged at an edge of an inner end face of the touch-sensitive key protective film 1. A connecting end 16 is arranged at an end of the touch-sensitive key protective film 1, an arc-shaped groove 17 is inwardly formed on both outer side walls in a width direction of the connecting end 16 respectively, and the arc-shaped groove 17 is arranged to be away from a center of the touch-sensitive key protective film 1.

It should be further noted that two outer side walls are available to the touch-sensitive key protective film 1, one is a smooth outer side wall illustrated in FIG. 3(a), and the other is an outer side wall with the arc-shaped groove 17 illustrated in FIG. 3(b). The arc-shaped groove 17 is configured for meshed positioning with a mobile phone shell 2, and a C-shaped meshing plane is formed between the arc-shaped groove 17 and a side wall of the connecting end 16, so that the connecting end 16 of the touch-sensitive key protective film 1 can mesh with the mobile phone shell 2. A depth of the arc-shaped groove 17 should not be greater than a width of the round chamfer 15 to avoid encroaching on a fingerprint recognition surface of the touch-sensitive key protective film 1.

It can be understood that such arrangement, through the round chamfer 15, achieves cambered transition at an outer edge of the touch-sensitive key protective film 1, thereby avoiding damage to the user's skin caused by sharp edges and corners. A chamfer is not arranged at the edge of an inner end face of the touch-sensitive key protective film 1, to ensure that the inner end face of the touch-sensitive key protective film 1 is in contact with the touch-sensitive key 102 disposed on the side edge of the mobile phone in a larger area, so that the touch-sensitive key protective film 1 can be more securely stuck to the touch-sensitive key 102 disposed on the side edge of the mobile phone.

With reference to FIG. 4, the thickness of the explosion-proof film layer 12 is 0.1 mm, and the thickness of the glass layer 13 is 0.2 mm in this embodiment, to ensure that the touch-sensitive key protective film 1 has sufficient protective strength.

It can be understood that through such arrangement, the 0.1 mm thick explosion-proof film layer 12 and the 0.2 mm thick glass layer 13 form a membrane with good protective performance and a moderate thickness. Due to conductivity of the conductive adhesive, the explosion-proof film layer 12 and the glass layer 13 do not affect the electrical conductivity, so that the touch-sensitive key 102 disposed on the side edge of the mobile phone pasted with the touch-sensitive key protective film 1 can normally recognize fingerprints and finger operations.

Figure 6:
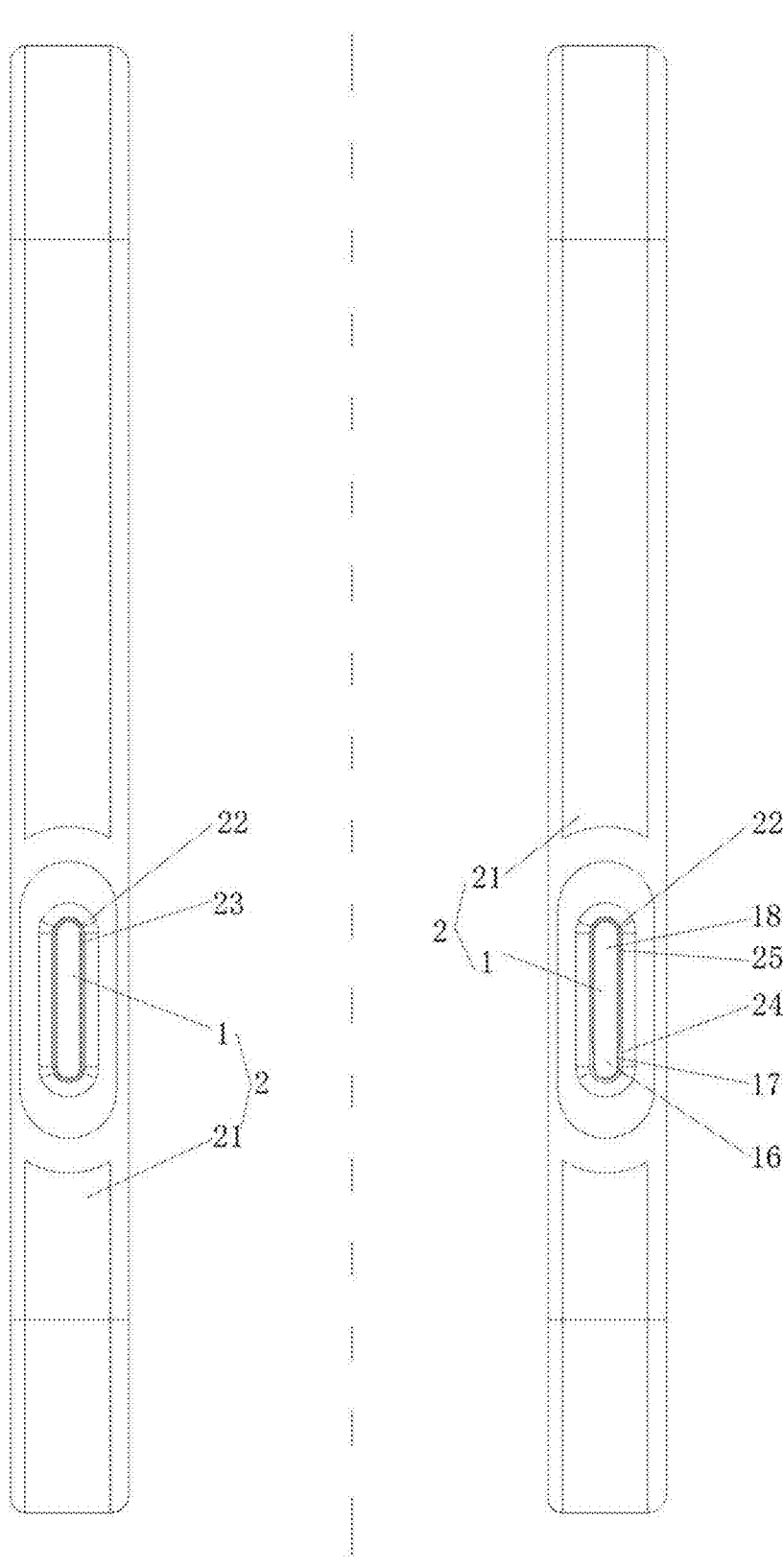
FIG. 6 is a schematic diagram of a planar structure of a mobile phone shell combined with two kinds of touch-sensitive key protective films in an embodiment of the present disclosure.

With reference to FIGS. 3 and 6, in an embodiment of the present disclosure, a mobile phone shell 2 with the touch-sensitive key protective film 1 is further provided, including a shell body 21 and the touch-sensitive key protective film 1. An obround hole 22 is formed at a position of a side wall of the shell body 21 corresponding to the touch-sensitive key 102 disposed on the side edge of the mobile phone. The touch-sensitive key protective film 1 is located inside the obround hole 22 and pasted on the end face of the touch-sensitive key 102 disposed on the side edge of the mobile phone, and a gap 23 for movement of the touch-sensitive key protective film 1 is formed between an outer side wall of the touch-sensitive key protective film 1 and an inner side wall of the obround hole 22.

The mobile phone shell 2 in this embodiment protects the mobile phone 101 well by wrapping the mobile phone 101. The touch-sensitive key protective film 1 protects the touch-sensitive key 102 disposed on the side edge of the mobile phone, without prejudice to the fingerprint recognition function of the touch-sensitive key 102 disposed on the side edge of the mobile phone, and also prevents the touch-sensitive key 102 disposed on the side edge of the mobile phone from being scratched or damaged, so that the mobile phone shell 2 is capable of better protecting the mobile phone 101.

With reference to FIG. 3 and FIG. 6, the obround hole 22 is provided with a connecting portion 24 and a clearance portion 25 in this embodiment, to ensure that the mobile phone shell 2 is stably connected to the touch-sensitive key protective film 1. The connecting portion 24 is in interference fit with a connecting end 16 of the touch-sensitive key protective film 1, and the clearance portion 25 fits with the gap 23 of a movable end 18 of the touch-sensitive key protective film 1.

It can be understood that through such arrangement, an inner wall of the connecting portion 24 of the obround hole 22 meshes with the C-shaped meshing plane of the connecting end 16 of the touch-sensitive key protective film 1, so that the connecting portion 24 of the obround hole 22 is in meshed connection with the connecting end 16 of the touch-sensitive key protective film 1, thereby ensuring a stable connection between the touch-sensitive key protective film 1 and the mobile phone shell 2. The mobile phone shell 2 in an area of the obround hole 22 is made of a soft rubber material, so that the connecting portion 24 of the obround hole 22 tightly meshes with the connecting end 16 of the touch-sensitive key protective film 1. Further, the connecting portion 24 of the obround hole 22 can slightly move along with the connecting end 16 of the touch-sensitive key protective film 1. The gap 23 between the clearance portion 25 and the movable end 18 of the touch-sensitive key protective film 1 ensures that the movable end 18 of the touch-sensitive key protective film 1 has a space for movement, so that the touch-sensitive key protective film 1 can follow pressing and rebounding actions of the touch-sensitive key 102 disposed on the side edge of the mobile phone.

With reference to FIGS. 1-4, a protective film sticking device 3 for the touch-sensitive key protective film 1 is provided in an embodiment of the present disclosure, including a jig 4, a positioning sheet 5, a release film 6, and the above touch-sensitive key protective film 1. The jig 4 matches the mobile phone 101 in shape, and the jig 4 is buckled to the mobile phone 101 from a back of the mobile phone 101. A protective film sticking hole 41 is formed in a side wall of the jig 4 at the location of the touch-sensitive key 102 disposed on the side edge of the mobile phone. The protective film sticking hole 41 matches the touch-sensitive key protective film 1 in shape, and the touch-sensitive key protective film 1 is positioned with the touch-sensitive key 102 disposed on the side edge of the mobile phone through the protective film sticking hole 41, stuck and fixed to the end face of the touch-sensitive key 102 disposed on the side edge of the mobile phone through the conductive adhesive layer 11 of the touch-sensitive key protective film 1.

It should be further noted that the protective film sticking device 3 illustrated in FIG. 1 can simultaneously stick the touch-sensitive key protective film 1 and the screen protector 7. The protective film sticking device 3 in FIG. 1 has a good aligning effect. FIG. 4 illustrates another protective film sticking device 3, where the jig 4 and the touch-sensitive key protective film 1 are separated from each other, and the touch-sensitive key protective film 1 is stuck to the protective film sticking hole 41 after alignment by a user.

The protective film sticking device 3 in this embodiment is in positioning connection with the mobile phone 101 through the jig 4, so that the mobile phone 101 and the touch-sensitive key protective film 1 are pre-positioned. The protective film sticking hole 41 on the jig 4 is configured to boost a process of sticking the touch-sensitive key protective film 1, and a hole wall of the protective film sticking hole 41 is configured to guide and help the touch-sensitive key protective film 1 to be accurately aligned with the touch-sensitive key 102 disposed on the side edge of the mobile phone, thereby ensuring that the touch-sensitive key protective film 1 can be securely stuck to the end face of the touch-sensitive key 102 disposed on the side edge of the mobile phone.

With reference to FIG. 4, the touch-sensitive key protective film 1 is arranged between the positioning sheet 5 and the release film 6 in this embodiment, in order to quickly complete the positioning of the touch-sensitive key protective film 1 with the mobile phone 101. Before protective film sticking, the release film 6 is separated from the conductive adhesive layer 11 of the touch-sensitive key protective film 1, and the touch-sensitive key protective film 1 is connected to the jig 4 through the positioning sheet 5. The positioning sheet 5 is provided with a connecting area 51 and a first protective film sticking area 52, where the connecting area 51 is fixedly connected to the jig 4. The touch-sensitive key protective film 1 is located in the first protective film sticking area 52, and the first protective film sticking area 52 is coated on an outer side surface of the side wall of the jig 4 in the protective film sticking process, so that the touch-sensitive key protective film 1 is embedded in the protective film sticking hole 41.

It should be further noted that the jig 4 is provided with a positioning groove 42 sunk around the protective film sticking hole 41, and a protruding block 53 that matches the positioning groove 42 in shape is arranged on the positioning sheet 5. The protruding block 53 can be made up of foam blocks or plastic blocks. The touch-sensitive key protective film 1 can be detachably arranged on the protruding block 53, and is aligned with the positioning groove 42 through the protruding block 53, so that the touch-sensitive key protective film 1 can be accurately aligned with the protective film sticking hole 41, thereby ensuring that the touch-sensitive key protective film 1 can be accurately stuck to the touch-sensitive key 102 disposed on the side edge of the mobile phone.

It can be understood that through such arrangement, the touch-sensitive key protective film 1 is connected to the jig 4 through the positioning sheet 5, and the jig 4 is buckled to the mobile phone 101, to complete the pre-positioning of the mobile phone 101 and the touch-sensitive key protective film 1. By flipping the positioning sheet 5, the protruding block 53 and the positioning groove 42 can be aligned with each other, so that the touch-sensitive key protective film 1 is accurately aligned with the mobile phone 101, and then the touch-sensitive key protective film 1 is accurately stuck to the end face of the touch-sensitive key 102 disposed on the side edge of the mobile phone.

With reference to FIG. 1, the positioning sheet 5 is further provided with a second protective film sticking area 54 in this embodiment, to help the positioning sheet 5 and the jig 4 to better align in the protective film sticking process. In the protective film sticking process, the second protective film sticking area 54 covers a front side of the jig 4. The positioning sheet 5 is provided with positioning holes 55 in both the second protective film sticking area 54 and the first protective film sticking area 52, and the jig 4 is correspondingly provided with positioning blocks 43. In the protective film sticking process, the positioning sheet 5 is in positioning connection with the jig 4 through the positioning holes 55 and the positioning blocks 43 that match each other.

It can be understood that due to such arrangement, the relatively large positioning sheet 5 can be aligned well with the jig 4 through the positioning of two sets of positioning blocks 43 and positioning holes 55, so that the touch-sensitive key protective film 1 can be more accurately stuck to the touch-sensitive key 102 disposed on the side edge of the mobile phone.

With reference to FIG. 1, the screen protector 7 is arranged in the second protective film sticking area 54 of the positioning sheet 5 in this embodiment, in order to expand a use scope of the protective film sticking device 3. In the protective film sticking process, the screen protector 7 is stuck to a screen of the mobile phone 101.

It should be further noted that the positioning sheet 5 is a plastic film with certain rigidity and flexibility. The connecting area 51 of the positioning sheet 5 is fixed to a back of the jig 4 by means of ultrasonic welding or adhesive. A crease 56 is arranged between the first protective film sticking area 52 and the second protective film sticking area 54 of the positioning sheet 5, and between the connecting area 51 and the first protective film sticking area 52 of the positioning sheet 5 respectively, so that the first protective film sticking area 52 and the second protective film sticking area 54 are bent along the crease 56 as a boundary. The first protective film sticking area 52 matches an outer side wall surface of the jig 4, so that the first protective film sticking area 52 can wrap the outer side wall of the jig 4, and the second protective film sticking area 54 is bent to the front side of the jig 4, thereby ensuring that the screen protector 7 can be aligned with the screen of the mobile phone 101. Through the positioning blocks 43 and the positioning holes 55, the positioning sheet 5 is aligned with the jig 4, which ensures that the screen protector 7 is further aligned with the screen of the mobile phone 101.

It can be understood that through such arrangement, the touch-sensitive key protective film 1 and the screen protector 7 are arranged on the same positioning sheet 5, so that when the positioning sheet 5 is aligned one time, both the touch-sensitive key protective film 1 and the screen protector 7 can be stuck simultaneously, which expands the use scope of the protective film sticking device 3 and reduces the protective film sticking cost of the user.

For the protective film sticking device 3 for the touch-sensitive key protective film 1 in an embodiment of the present disclosure, the jig 4 is first buckled onto the mobile phone 101 from behind, the positioning sheet 5 is placed on one side of the jig 4 (as shown in FIG. 1), the touch-sensitive key protective film 1 and the release film 6 on the screen protector 7 are peeled off, and the positioning sheet 5 is flipped, so that the first protective film sticking area 52 is tightly stuck to the outer side wall of the jig 4, and the second protective film sticking area 54 covers the screen of the mobile phone 101. The two sets of positioning holes 55 and positioning blocks 43 are aligned, and the protruding block 53 and the positioning groove 42 are aligned at the same time, to complete the alignment of the touch-sensitive key protective film 1 with the touch-sensitive key 102 disposed on the side edge of the mobile phone, and the alignment of the screen protector 7 with the screen of the mobile phone. The protruding block 53 and the screen protector 7 are pressed, so that the touch-sensitive key protective film 1 is stuck to the touch-sensitive key 102 disposed on the side edge of the mobile phone, and the screen protector 7 is stuck to the screen of the mobile phone 101. Then the positioning sheet 5 is turned over, so that the positioning sheet 5 is separated from the screen protector 7, and the touch-sensitive key protective film 1 is separated from the protruding block 53. Finally, the mobile phone 101 is taken out of the jig 4, to complete the sticking of the touch-sensitive key protective film 1 and the screen protector 7.

The foregoing descriptions are not intended to limit the technical scope of the present disclosure. Therefore, any alteration, equivalent change and modification which are made to the above embodiments in accordance with the technical essence of the present invention all fall within the scope of protection of the technical solution of the present disclosure.

What it claimed is:

1. A touch-sensitive key protective film stuck to an end face of a touch-sensitive key disposed on a side edge of the mobile phone, wherein the touch-sensitive key protective film is an obround membrane, and an area of the touch-sensitive key protective film is not larger than that of the end face of the touch-sensitive key disposed on the side edge of the mobile phone; the touch-sensitive key protective film comprises a conductive adhesive layer, an explosion-proof film layer, a glass layer, and an oil-resistant layer that are sequentially arranged, wherein the conductive adhesive layer is bonded to the end face of the touch-sensitive key disposed on the side edge of the mobile phone, a thickness of the explosion-proof film layer is 0.08-0.12 mm, and the thickness of the glass layer is 0.18-0.22 mm.

2. The touch-sensitive key protective film according to claim 1, wherein the oil-resistant layer is an anti-fingerprint (AF) coating sprayed and cured on a surface of the glass layer.

3. The touch-sensitive key protective film according to claim 1, wherein a round chamfer is arranged at an edge of an outer end face of the touch-sensitive key protective film, while a chamfer is not arranged at an edge of an inner end face of the touch-sensitive key protective film; and a connecting end is arranged at an end of the touch-sensitive key protective film, an arc-shaped groove is inwardly formed on both outer side walls in a width direction of the connecting end respectively, and the arc-shaped groove is arranged to be away from a center of the touch-sensitive key protective film.

4. The touch-sensitive key protective film according to claim 1, wherein a thickness of the explosion-proof film layer is 0.1 mm, and the thickness of the glass layer is 0.2 mm.

5. A mobile phone shell, comprising a shell body and the touch-sensitive key protective film according to claim 1, wherein an obround hole is formed at a position of a side wall of the shell body corresponding to the touch-sensitive key disposed on the side edge of the mobile phone; the touch-sensitive key protective film is located inside the obround hole and pasted on the end face of the touch-sensitive key disposed on the side edge of the mobile phone, and a gap for movement of the touch-sensitive key protective film is formed between an outer side wall of the touch-sensitive key protective film and an inner side wall of the obround hole.

6. The mobile phone shell according to claim 5, wherein the obround hole is provided with a connecting portion and a clearance portion, the connecting portion is in interference fit with a connecting end of the touch-sensitive key protective film, and the clearance portion fits with the gap of a movable end of the touch-sensitive key protective film.

7. A protective film sticking device, comprising a jig and the touch-sensitive key protective film according to claim 1, wherein the jig matches the mobile phone in shape, and the jig is buckled to the mobile phone from a back of the mobile phone; a protective film sticking hole is formed in a side wall of the jig at the location of the touch-sensitive key disposed on the side edge of the mobile phone; the protective film sticking hole matches the touch-sensitive key protective film in shape, and the touch-sensitive key protective film is positioned with the touch-sensitive key disposed on the side edge of the mobile phone through the protective film sticking hole, stuck and fixed to the end face of the touch-sensitive key disposed on the side edge of the mobile phone through the conductive adhesive layer of the touch-sensitive key protective film.

8. The protective film sticking device according to claim 7, further comprising a positioning sheet and a release film, wherein the touch-sensitive key protective film is arranged between the positioning sheet and the release film; before protective film sticking, the release film is separated from the conductive adhesive layer of the touch-sensitive key protective film, and the touch-sensitive key protective film is connected to the jig through the positioning sheet; the positioning sheet is provided with a connecting area and a first protective film sticking area, wherein the connecting area is fixedly connected to the jig; the touch-sensitive key protective film is located in the first protective film sticking area, and the first protective film sticking area is coated on an outer side surface of the side wall of the jig in the protective film sticking process, so that the touch-sensitive key protective film is embedded in the protective film sticking hole.

9. The protective film sticking device according to claim 8, wherein the positioning sheet is further provided with a second protective film sticking area; in the protective film sticking process, the second protective film sticking area covers a front side of the jig; the positioning sheet is provided with positioning holes in both the second protective film sticking area and the first protective film sticking area, and the jig is correspondingly provided with positioning blocks; and in the protective film sticking process, the positioning sheet is in positioning connection with the jig through the positioning holes and the positioning blocks that match each other.

10. The protective film sticking device according to claim 8, wherein the screen protector is arranged in the second protective film sticking area of the positioning sheet, and in the protective film sticking process, the screen protector is stuck to a screen of the mobile phone.

\* \* \* \* \*